(12) United States Patent
Sauciuc et al.

(10) Patent No.: US 7,508,671 B2
(45) Date of Patent: Mar. 24, 2009

(54) COMPUTER SYSTEM HAVING CONTROLLED COOLING

(75) Inventors: Ioan Sauciuc, Phoenix, AZ (US); Gregory M. Chrysler, Chandler, AZ (US); Ravi V. Mahajan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 10/683,924

(22) Filed: Oct. 10, 2003

(65) Prior Publication Data
US 2005/0078451 A1 Apr. 14, 2005

(51) Int. Cl.
H05K 7/20 (2006.01)
G05B 9/02 (2006.01)

(52) U.S. Cl. .................. 361/700; 361/695; 361/697; 361/687; 165/80.3; 165/80.4; 165/104.33; 165/185; 257/712; 62/3.2; 62/3.6; 62/3.7; 700/79; 700/299; 700/300; 219/499; 219/497; 219/505

(58) Field of Classification Search ............. 361/687, 361/688, 690–697, 698–704, 707–714, 717–721; 62/3.2, 3.7, 259.2; 165/80.2, 80.3, 80.4, 165/185, 104.21, 104.26; 174/15.2, 16.3; 219/497, 499, 494, 501, 505, 508
See application file for complete search history.

(56) References Cited

U.S. PATENT DOCUMENTS

| 4,001,649 | A | * | 1/1977 | Young | 361/106 |
| 4,685,081 | A | * | 8/1987 | Richman | 365/1 |
| 4,812,733 | A | * | 3/1989 | Tobey | 323/285 |
| 4,848,090 | A | * | 7/1989 | Peters | 62/3.3 |
| 4,918,505 | A | * | 4/1990 | Blouke et al. | 257/244 |
| 4,924,112 | A | * | 5/1990 | Anderson et al. | 326/32 |
| 4,935,864 | A | * | 6/1990 | Schmidt et al. | 363/141 |
| 5,406,212 | A | * | 4/1995 | Hashinaga et al. | 324/760 |
| 5,419,780 | A | * | 5/1995 | Suski | 136/205 |
| 5,457,342 | A | * | 10/1995 | Herbst, II | 257/712 |
| 5,569,950 | A | * | 10/1996 | Lewis et al. | 257/467 |
| 5,639,163 | A | * | 6/1997 | Davidson et al. | 374/178 |
| 5,676,199 | A | * | 10/1997 | Lee | 165/80.3 |
| 5,690,849 | A | * | 11/1997 | DeVilbiss et al. | 219/497 |
| 5,831,333 | A | * | 11/1998 | Malladi et al. | 257/712 |
| 5,921,087 | A | * | 7/1999 | Bhatia et al. | 62/3.2 |
| 5,927,078 | A | * | 7/1999 | Watanabe et al. | 62/3.6 |
| 5,961,215 | A | * | 10/1999 | Lee et al. | 374/178 |

(Continued)

FOREIGN PATENT DOCUMENTS

JP 2000-165077 6/2000

(Continued)

Primary Examiner—Michael V Datskovskiy
(74) Attorney, Agent, or Firm—Blakely, Sokoloff, Taylor & Zafman LLP

(57) ABSTRACT

A computer system and its method of cooling are provided. A vapor chamber serves as a heat spreader for heat from the microelectronic die. A thermoelectric module serves to cool the vapor chamber and maintain proper functioning of the vapor chamber, thus keeping the microelectronic die cooled. A controller receives input from five temperature sensors, and utilizes the input to control current to the thermoelectric module and voltage/current to a motor that drives a fan and provides additional cooling. A current sensor allows the controller to monitor and limit power provided to the thermoelectric module.

3 Claims, 3 Drawing Sheets

U.S. PATENT DOCUMENTS

| | | | | |
|---|---|---|---|---|
| 6,011,371 | A * | 1/2000 | Van Brocklin et al. | 318/471 |
| 6,037,732 | A * | 3/2000 | Alfano et al. | 318/471 |
| 6,055,814 | A * | 5/2000 | Song | 62/3.2 |
| 6,094,918 | A * | 8/2000 | Burbidge et al. | 62/3.7 |
| 6,143,975 | A * | 11/2000 | Liao et al. | 136/201 |
| 6,149,299 | A * | 11/2000 | Aslan et al. | 374/178 |
| 6,169,442 | B1 * | 1/2001 | Meehan et al. | 327/513 |
| 6,173,576 | B1 * | 1/2001 | Ishida et al. | 62/3.7 |
| 6,196,003 | B1 | 3/2001 | Macias et al. | |
| 6,216,235 | B1 * | 4/2001 | Thomas et al. | 713/501 |
| 6,318,965 | B1 * | 11/2001 | Nair | 417/2 |
| 6,384,733 | B1 * | 5/2002 | Seesemann | 340/648 |
| 6,470,696 | B1 * | 10/2002 | Palfy et al. | 62/140 |
| 6,474,074 | B2 * | 11/2002 | Ghoshal | 62/3.7 |
| 6,487,463 | B1 * | 11/2002 | Stepp, III | 700/79 |
| 6,499,306 | B2 * | 12/2002 | Gillen | 62/129 |
| 6,512,209 | B1 * | 1/2003 | Yano | 219/497 |
| 6,525,934 | B1 * | 2/2003 | Nakanishi et al. | 361/687 |
| 6,597,972 | B2 * | 7/2003 | Emberty et al. | 700/304 |
| 6,725,669 | B2 * | 4/2004 | Melaragni | 62/3.7 |
| 6,728,653 | B1 * | 4/2004 | Figueredo | 702/117 |
| 6,747,572 | B2 * | 6/2004 | Bocko et al. | 340/870.16 |
| 6,798,659 | B2 * | 9/2004 | Chen | 361/697 |
| 6,817,191 | B2 * | 11/2004 | Watanabe | 62/3.7 |
| 6,822,861 | B2 * | 11/2004 | Meir | 361/695 |
| 6,856,921 | B2 * | 2/2005 | Cohen et al. | 702/60 |
| 6,931,306 | B2 * | 8/2005 | Frankel et al. | 700/300 |
| 6,987,370 | B2 * | 1/2006 | Chheda et al. | 318/400.08 |
| 7,052,179 | B2 * | 5/2006 | Tesi | 374/178 |
| 7,082,772 | B2 * | 8/2006 | Welch | 62/3.2 |
| 7,107,178 | B2 * | 9/2006 | Won et al. | 702/130 |
| 7,185,500 | B2 * | 3/2007 | Meir | 62/3.2 |
| 7,228,508 | B1 * | 6/2007 | Pippin | 716/1 |
| 2003/0063437 | A1 * | 4/2003 | Kurihara | 361/688 |
| 2003/0117760 | A1 * | 6/2003 | Meir | 361/103 |
| 2003/0135601 | A1 * | 7/2003 | Pozzuoli | 709/223 |
| 2004/0066837 | A1 * | 4/2004 | Armour et al. | 374/178 |
| 2005/0039465 | A1 * | 2/2005 | Welch | 62/3.7 |
| 2005/0174737 | A1 * | 8/2005 | Meir | 361/697 |
| 2005/0204747 | A1 * | 9/2005 | Atkinson | 62/3.7 |

FOREIGN PATENT DOCUMENTS

| | | | |
|---|---|---|---|
| JP | 02000305632 A * | 11/2000 | |
| JP | 2001-221583 | 8/2001 | |
| JP | 2002-151784 | 5/2002 | |
| JP | 2002-164607 | 6/2002 | |
| JP | 2002-280659 | 9/2002 | |
| JP | 2002-280660 | 9/2002 | |
| JP | 2002-280661 | 9/2002 | |
| JP | 02003028768 A * | 1/2003 | |
| JP | 2003-075084 | 3/2003 | |
| JP | 2003-148882 | 5/2003 | |
| JP | 2003-179296 | 6/2003 | |
| JP | 2003-218448 | 7/2003 | |
| SU | 682884 * | 8/1979 | |
| WO | WO 01/35200 A1 | 5/2001 | |
| WO | WO 03/046702 A2 | 6/2003 | |

* cited by examiner

US 7,508,671 B2

COMPUTER SYSTEM HAVING CONTROLLED COOLING

BACKGROUND OF THE INVENTION

1). Field of the Invention

This invention relates generally to a computer system, and more specifically to systems that are used to cool a microelectronic die of the computer system.

2). Discussion of Related Art

As semiconductor devices, such as processors and processing elements, operate at continually higher data rates and higher frequencies, they generally consume greater current and produce more heat. It is desirable to maintain operation of these devices within certain temperature ranges for reliability reasons, among others. Conventional heat transfer mechanisms have restricted the operation of such devices to lower power levels, lower data rates, and/or lower operating frequencies. Conventional heat transfer mechanisms have limited heat transfer capability due to size and location restrictions, as well as thermal limitations.

BRIEF DESCRIPTION OF THE DRAWINGS

The invention is described by way of example with reference to the accompanying drawings, wherein.

DETAILED DESCRIPTION OF THE INVENTION

A computer system and its method of cooling are provided. A vapor chamber serves as a heat spreader for heat from the microelectronic die. A thermoelectric module serves to cool the vapor chamber and maintain proper functioning of the vapor chamber, thus keeping the microelectronic die cooled. A controller receives input from five temperature sensors, and utilizes the input to control current to the thermoelectric module and voltage/current to a motor that drives a fan and provides additional cooling. A current sensor allows the controller to monitor and limit power provided to the thermoelectric module.

Figure 1:
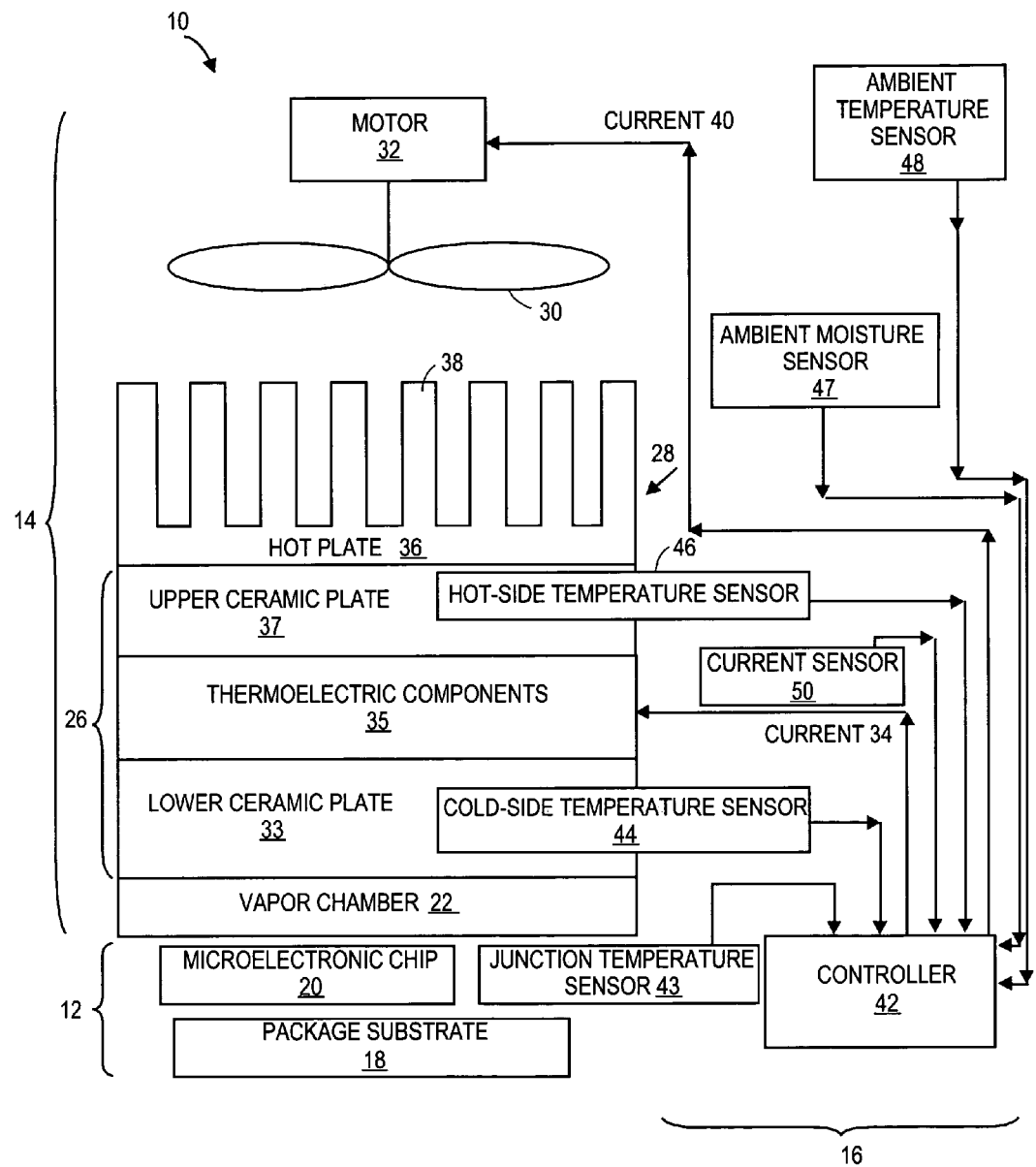
FIG. 1 is a block diagram illustrating components of a computer system, according to an embodiment of the invention.

FIG. 1 of the accompanying drawings illustrates components of a computer system 10, according to an embodiment of the invention, including a computer processor 12, a cooling apparatus 14 for the computer processor 12, and a control apparatus 16 for the cooling apparatus 14.

The computer processor 12 includes a package substrate 18 and a microelectronic die 20 mounted to the package substrate 18. The microelectronic die 20 has a microelectronic circuit formed therein. The package substrate 18 provides structural support for the microelectronic die 20. The package substrate 18 also has metal lines through which signals, power, and ground can be provided to the microelectronic die 20. The microelectronic die 20 heats up when the circuit is operated. Heat generated by the microelectronic die 20 has to be removed, preferably in a controlled manner, in order to avoid damage to the circuit due to excessive temperatures.

The cooling apparatus 14 includes a vapor chamber 22, a thermoelectric module 26, a heat sink 28, a fan 30, and a motor 32.

The vapor chamber 22 is located on the microelectronic die 20 so that heat can conduct from the microelectronic die 20 through a lower wall of the vapor chamber 22. The vapor chamber 22 has a larger footprint than the microelectronic die 20, and serves as a heat spreader that spreads heat coming from the microelectronic die 20. The vapor chamber 22 has a wicking structure on internal surfaces of walls thereof, and is filled with a fluid that can condense onto or evaporate from the wicking structure. The heat conducting from the microelectronic die 20 evaporates the fluid from the wicking structure on the lower wall of the vapor chamber 22, and the fluid then condenses on the wicking structure on an upper wall of the vapor chamber 22. The condensed fluid then flows back in the wicking structure to the lower wall, where it is again evaporated. The temperature of the lower wall of the vapor chamber 22 has to be accurately controlled in order to maintain the processor 12 below a predetermined temperature.

A lower ceramic plate 33 of the thermoelectric module 26 is located on the vapor chamber 22. Heat conducts from the upper wall of the vapor chamber 22 through the electrically insulative lower ceramic plate 33 to an upper surface of the lower ceramic plate 33. An upper surface of the lower ceramic plate 33 is at a lower temperature than a lower surface thereof. The thermoelectric module 26 also includes thermoelectric components 35 located on the lower ceramic plate 33. The thermoelectric components 35 are typically a plurality of doped semiconductor components. When current is provided to the semiconductor components, the semiconductor components can pump heat, and the direction that the heat is pumped depends on the dopant type of the semiconductor components and the direction of the current. Thermoelectric modules are known in the art and are therefore not described in detail herein. Suffice to say that current 34 is provided to the thermoelectric module 26, which causes the thermoelectric components 35 to pump heat from the lower ceramic plate 33 to an electrically insulative upper ceramic plate 37 thereof. The upper surface of the thermoelectric module 26 is then warmer than a lower surface thereof.

The heat sink 28 includes a hot plate 36 and a plurality of fins 38 extending from the hot plate 36. The hot plate 36 is located on the upper surface of the thermoelectric module 26. The heat conducts from the upper surface of the thermoelectric module 26 through the hot plate 36 to the fins 38, from where the heat can convect to surrounding air.

The fan 30 is coupled to the motor 32 so that the motor 32 rotates the fan 30 when current 40 is provided to the motor 32. The fan 30 blows air over the fins 38, which increases the transfer of heat from the fins 38, depending on the temperatures of the fins 38 and the air.

The control apparatus 16 includes a controller 42, a junction temperature sensor 43, a cold-side temperature sensor 44, a hot-side temperature sensor 46, an ambient moisture sensor 47, an ambient temperature sensor 48, and a current sensor 50.

The junction temperature sensor 43 is typically located within the microelectronic chip 20. The cold-side temperature sensor 44 is typically located on an upper surface of the lower ceramic plate 33 of the thermoelectric module 26. The hot-side temperature sensor 46 is typically located on a lower surface of the upper ceramic plate 37. The junction, cold-side, and hot-side temperature sensors 43, 44, and 46 are all connected to the controller 42 and provide feedback to the controller 42 of the temperature of the microelectronic chip and the temperatures at the bottom and top of the thermoelectric module 26, respectively. The controller 42 can control the current 34 provided to the thermoelectric module 26 based on the temperatures sensed by the junction, cold-side, and hot-side temperature sensors 43, 44, and 46. The junction temperature sensor 43 provides an indication to the controller 42 when the temperature of the microelectronic chip 20 approaches a predetermined maximum, in which case current provided to the thermoelectric module 26 is increased. The difference between the temperatures sensed by the cold-side and hot-side temperature sensors 44 and 46 is indicative of the degree of heat that is pumped by the thermoelectric module 26. The controller 42 can control the current 34 to maintain the temperature sensed by the junction temperature sensor 43 within a predetermined range. A substrate temperature sensor can be located on the package substrate 18 and provide temperature feedback to the controller 42 instead of or in addition to the junction temperature sensor 43.

The ambient moisture sensor 47 provides data to the controller 42 of moisture percentage in the surrounding air. The ambient temperature sensor 48 is also connected to the controller 42 to provide feedback to the controller 42 of a temperature of air sensed by the ambient temperature sensor 48 at a location distant from the other components illustrated in the drawing. The combined readings of moisture percentage and ambient temperature allow the controller 42 to calculate moisture content of surrounding air. The controller 42 regulates current to the thermoelectric module 26 in such a manner that condensation on cold parts is avoided. The temperature of the lower ceramic plate 33 as detected by the cold-side temperature sensor 44 will, for example, be held proportionately higher with a higher moisture content of the surrounding air.

The current sensor 50 detects the magnitude of the current 34 provided to the thermoelectric module 26. The current sensor 50 is connected to the controller 42 so that the controller 42 receives feedback of the magnitude of the current 34. Based on the resistance of the thermoelectric module, the controller 42 can calculate the voltage provided to the thermoelectric module 26 (R=V/I). The controller 42 can also control the current 40 provided to the motor 32. An increase in the current 40 provided to the motor 32 will be due to an increase in voltage provided to the motor 32.

Figure 2:
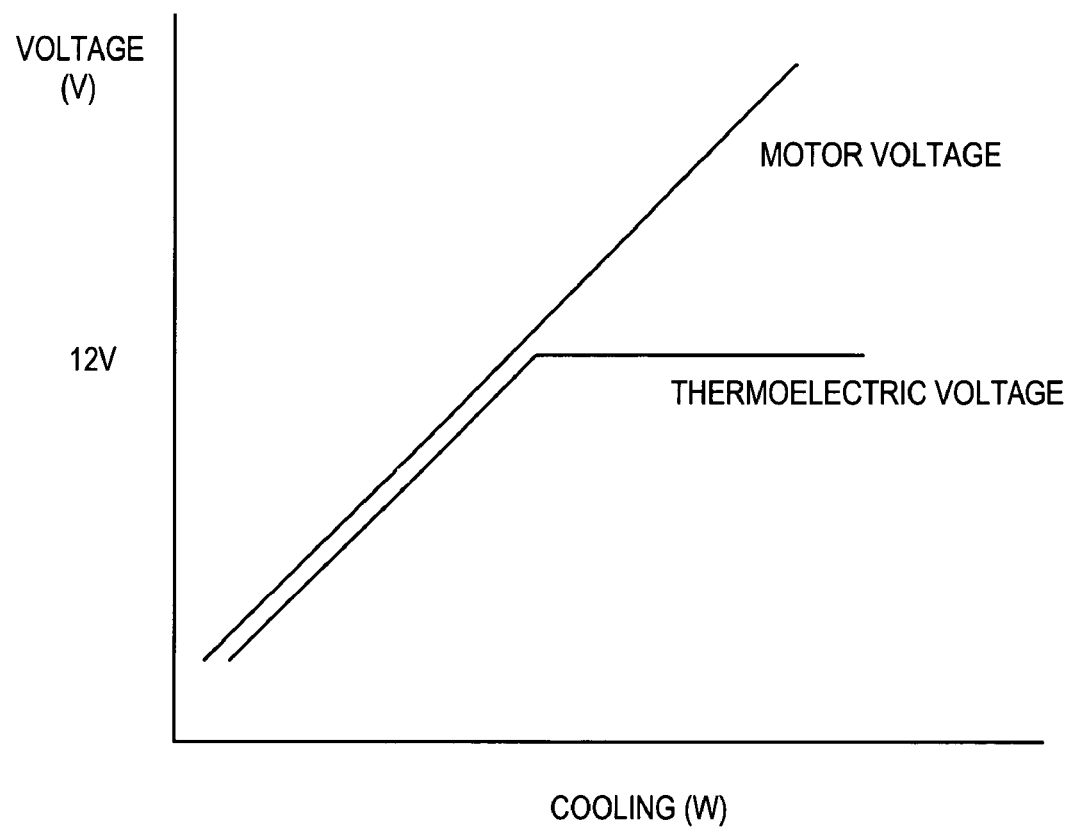
FIG. 2 is a graph of motor voltage and thermoelectric voltage as controlled by a controller of the computer system of FIG. 1.

FIG. 2 illustrates how the motor voltage and the thermoelectric voltage can be controlled by the controller 42. The motor voltage and thermoelectric voltage may each be increased linearly with an increase in the cooling requirements of the microelectronic die 20. The thermoelectric voltage may be limited to 12 volts by the controller 42, so that only the motor voltage is increased when more cooling is required than a predetermined amount. Thermoelectric modules are inherently inefficient, and therefore require a large amount of power. However, power can be conserved by limiting power to the thermoelectric module 26 and providing more power to the motor 32. A sufficient amount of power is still provided to the thermoelectric module 26, so as to keep the lower ceramic plate 33 at a temperature sufficiently low to ensure that the temperature of the processor 12 remains below a predetermined maximum temperature.

It can thus be seen that the vapor chamber 22 serves as a heat spreader for heat from the microelectronic die 20. The thermoelectric module 26 serves to cool the vapor chamber 22 and maintain proper functioning of the vapor chamber 22, and the temperature of the processor 12 below a predetermined maximum temperature. The controller 42, in this embodiment, receives input variables from five temperature sensors 43, 44, 46, 47, and 48, and utilizes the input variables to control the current 34 to the thermoelectric module 26 and the current 40 to the motor 32 that drives the fan 30 and provides additional cooling. The current sensor 50 allows the controller 42 to monitor and limit power provided to the thermoelectric module 26.

Figure 3:
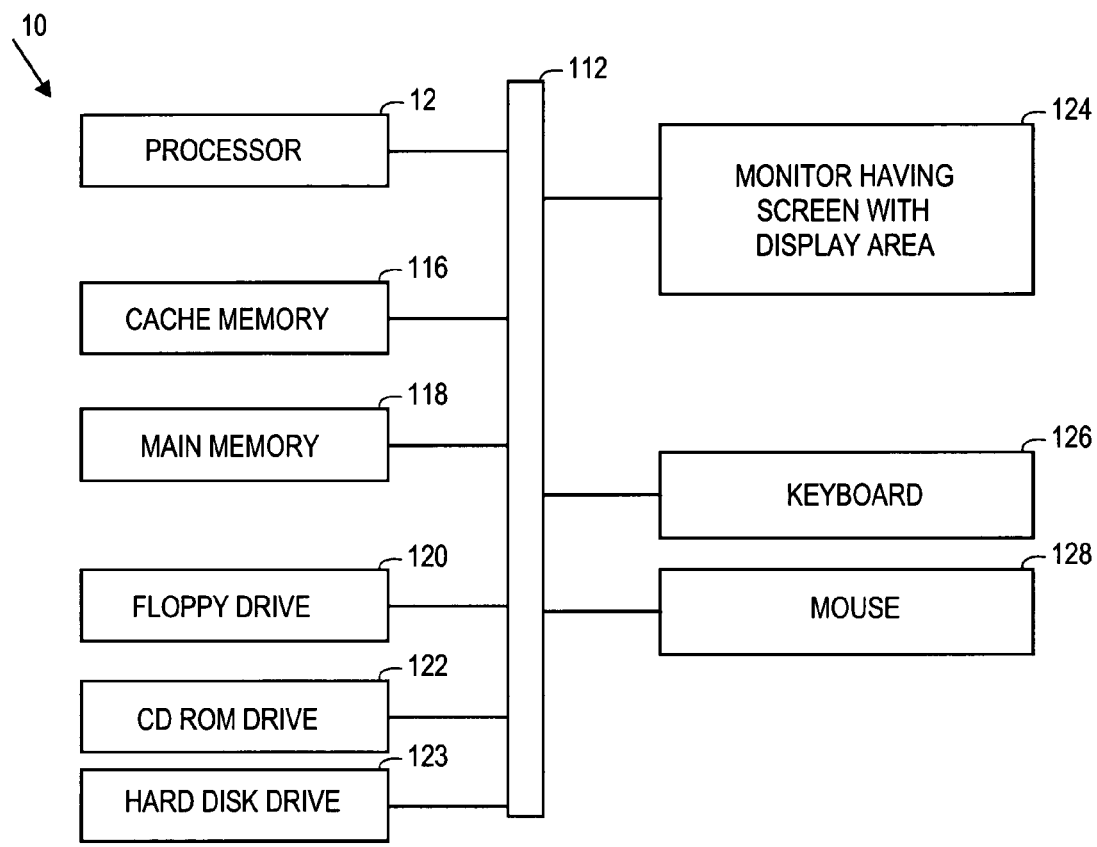
FIG. 3 is a block diagram illustrating further components of the computer system.

FIG. 3 of the accompanying drawings illustrates further components of the computer system 10. The computer system 10 further includes a bus 112 having connected thereto the processor 12, cache memory 116, main memory 118, a floppy drive 120, a compact disk read-only-memory (CD-ROM) drive 122, a hard disk drive 123, a monitor 124 having a screen with a display area, a keyboard 126, and a mouse 128. A list of instructions in the form of a program can be stored on, for example, a compact disk and be loaded in the CD-ROM drive 122. The instructions of the program can be loaded into the cache memory 116 and the main memory 118, while more of the instructions may reside on the compact disk and on the hard disk of the hard drive. The floppy drive 120 or the hard disk drive 123 may be used instead of the CD-ROM drive 122 to load instructions into the computer system 10. The instructions can be read by the processor 12 in a logical manner which ensures proper execution of the program. A user may interact utilizing the mouse 128 or the keyboard 126. A respective signal can be generated by the mouse 128 or the keyboard 126. The signal is sent through the bus 112 and ultimately to the processor 12, which responds to the signal to modify an execution of the program. Execution of the program by the processor 12 results in control of how information, stored in the main memory 118, the cache memory 116, the hard disk drive 123, or the CD-ROM drive 122, is displayed on the display area of the monitor 124.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:
1. A computer system, comprising:
a microelectronic die having an integrated circuit formed therein;
a thermoelectric module thermally coupled to the microelectronic die so as to pump heat from the microelectronic die when power is provided to the thermoelectric module;
a fan;
a motor coupled to the fan to rotate the fan, so that the fan cools the microelectronic die;
a vapor chamber between the microelectronic die and the thermoelectric module, the vapor chamber including a fluid, the fluid being evaporated when heat transfers thereto from the microelectronic die and condensing when heat transfers therefrom to the thermoelectric module;
a cold-side temperature sensor between the vapor chamber and the thermoelectric module;
a hot plate thermally coupled to the thermoelectric module, with the thermoelectric module between the microelectronic die and the hot plate;
a hot-side temperature sensor on a side of the thermoelectric module of the hot plate and opposing the microelectronic chip;
a junction temperature sensor within the microelectronic die; and
a controller connected to the cold-side temperature sensor, hot-side temperature sensor , and the junction temperature sensor to receive inputs from the cold-side temperature sensor, hot-side temperature sensor, and the junction temperature sensor, the controller controlling the power provided to the thermoelectric module and to the motor based on inputs from the cold-side temperature sensor, hot-side temperature sensor, and the junction temperature sensor;

wherein the junction temperature sensor provides an indication when the temperature of the microelectronic die approaches a predetermined maximum, in which case current provided to the thermoelectric module is increased;

wherein a difference between the cold-side temperature sensor and hot-side temperature sensor provides an indication of a degree of heat that is pumped by the thermoelectric module and is used to control an amount of current to the thermoelectric module in order to maintain a temperature sensed by the junction temperature sensor within a predetermined range; and wherein power to the thermoelectric module and motor increases/decreases with an increase/decrease, respectively, in cooling requirements of the microelectronic die up to a predetermined value for the thermoelectric module, and wherein above the predetermined value, the power to the thermoelectronic module is limited while the power to the motor continues to increase/decrease with an increase/decrease, respectively, in cooling requirements of the microelectronic die.

2. The computer system of claim 1, further comprising:
an ambient temperature sensor detecting ambient temperature of air distant from the microelectronic die and the thermoelectric module, the controller being connected to the ambient temperature sensor to receive an indication of temperature at the ambient temperature sensor, the controller controlling current provided to the thermoelectric module based on an input from the ambient temperature sensor.

3. The computer system of claim 2, further comprising:
an ambient moisture sensor detecting ambient moisture of air distant from the microelectronic die and the thermoelectric module, the controller being connected to the ambient moisture sensor to receive an indication of moisture at the ambient moisture sensor, the controller controlling current provided to the thermoelectric module based on an input from the ambient moisture sensor.

* * * * *